(12) United States Patent
Brouer et al.

(10) Patent No.: US 11,228,668 B2
(45) Date of Patent: Jan. 18, 2022

(54) EFFICIENT PACKET PROCESSING FOR EXPRESS DATA PATHS

(71) Applicant: RED HAT, INC., Raleigh, NC (US)

(72) Inventors: Jesper Brouer, Frederikssund (DK); Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 22 days.

(21) Appl. No.: 16/826,982

(22) Filed: Mar. 23, 2020

(65) Prior Publication Data

US 2021/0297510 A1 Sep. 23, 2021

(51) Int. Cl.
| | |
|---|---|
| H04L 29/06 | (2006.01) |
| H04L 12/861 | (2013.01) |
| H04L 12/823 | (2013.01) |
| H04L 12/741 | (2013.01) |
| H04L 12/813 | (2013.01) |
| H04L 29/08 | (2006.01) |

(52) U.S. Cl.
CPC .............. *H04L 69/22* (2013.01); *H04L 45/74* (2013.01); *H04L 47/20* (2013.01); *H04L 47/32* (2013.01); *H04L 49/90* (2013.01); *H04L 69/16* (2013.01); *H04L 69/32* (2013.01)

(58) Field of Classification Search
CPC ......... H04L 69/22; H04L 47/20; H04L 49/90; H04L 69/32; H04L 45/74; H04L 69/16; H04L 47/32
See application file for complete search history.

(56) References Cited

U.S. PATENT DOCUMENTS

| | | | |
|---|---|---|---|
| 2017/0163662 A1* | 6/2017 | Zhou | G06F 12/0813 |
| 2019/0140983 A1* | 5/2019 | Tu | H04L 43/028 |
| 2020/0145376 A1* | 5/2020 | Pope | H04L 63/0227 |

OTHER PUBLICATIONS

Hellwig, C. (Nov. 21, 2019). "Join GitHub Today" 4 pages.
"cache_init()" Jan. 6, 2020. http://www.qnx.com/developers/docs.
Hoiland-Jorgensen, T. et al. (Dec. 4-7, 2018). "The eXpress Data Path: Fast Programmable Packet Processing in the Operating System Kernel", CoNext '18.

\* cited by examiner

*Primary Examiner* — Charles C Jiang
*Assistant Examiner* — Shawn D Miller
(74) *Attorney, Agent, or Firm* — Womble Bond Dickinson (US) LLP

(57) ABSTRACT

A first filter specifying handling of one or more network packets received via a network is identified. A first set of access bounds to be used by a network interface card (NIC) to synchronize the one or more network packets received via the network is determined in view of the first filter. The first set of access bounds are provided to a driver of the NIC.

20 Claims, 11 Drawing Sheets

EFFICIENT PACKET PROCESSING FOR EXPRESS DATA PATHS

TECHNICAL FIELD

Aspects of the present disclosure relate to a network architecture, and more particularly, to efficient packet processing for express data paths.

BACKGROUND

An express data path (XDP) is a way for an operating system (OS) to handle networking packets coming from a network interface card (MC). A hook is placed in the NIC driver after interrupt processing before any memory allocation from the network stack. A filter program is then used to decide how the network packet is to be handled.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
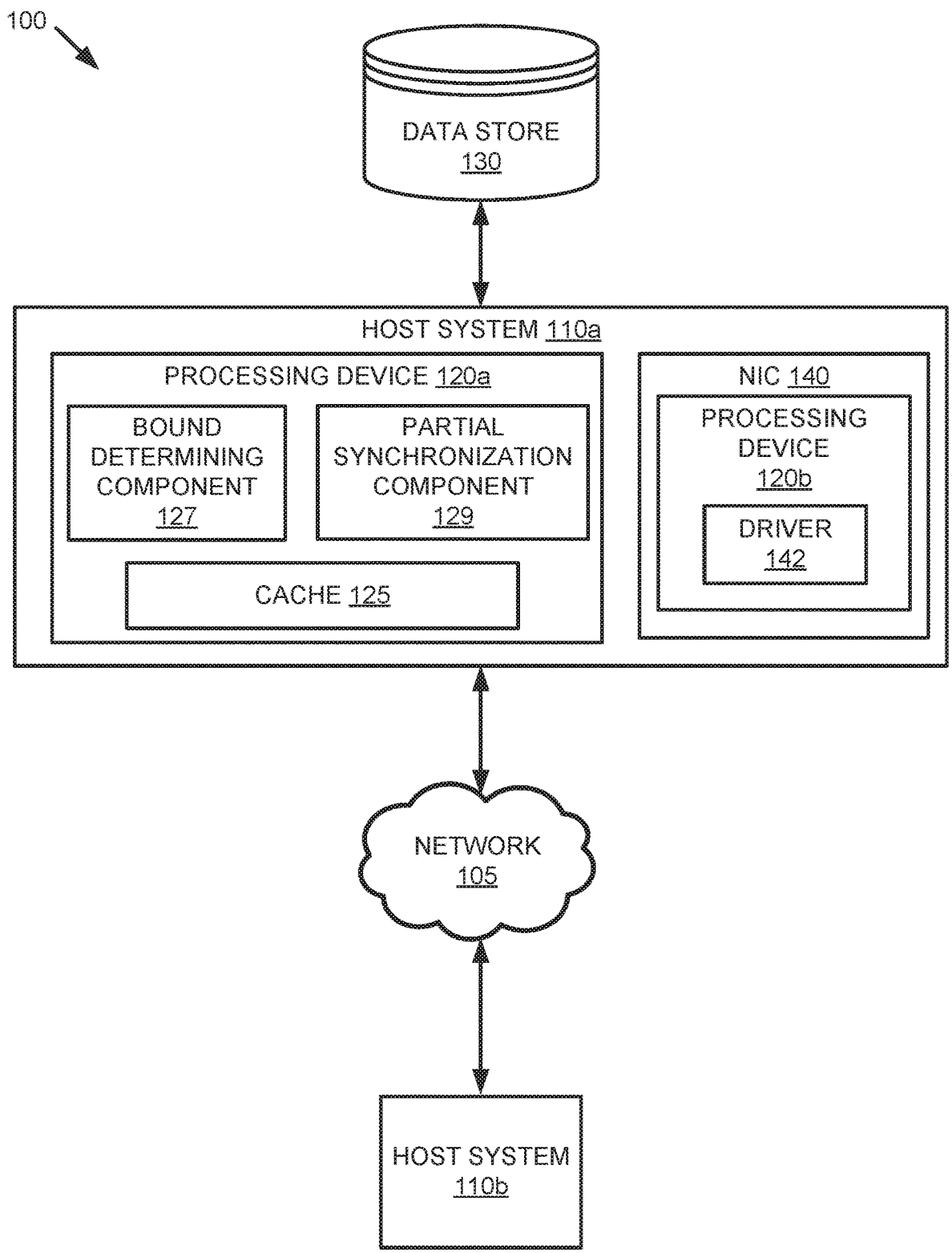
FIG. 1 is a block diagram that illustrates an example data center, in accordance with some embodiments.

An express data path (XDP) is a way for an operating system (OS) of a host system to handle networking packets coming from a network interface card (NIC). With XDP, a filter program (also referred to as "filter" hereafter) is received by a supervisor or OS of a host system. The filter may be executed after the NIC has received a network packet (also referred to as "packet" hereafter) and stored the packet into the memory of the NIC. The filter can then examine the packet to determine how the packet is to be utilized/handled, make any necessary modifications to the packet, and transmit a command to the NIC based on how the packet is determined to be handled.

In embodiments, the command may cause the NIC to perform one or more actions with regards to the packet. In some embodiments, the command may cause the NIC to drop the packet (e.g., XDP_DROP). In an embodiment, the command may cause the packet to be passed to an application executed by the host system (e.g., XDP_PASS). In embodiments, the command may cause the packet to be re-transmitted out of the NIC (e.g., XDP_TX). In some embodiments, the command may cause the NIC to transmit the packet to another device (e.g., XDP_REDIRECT).

To ensure that a filter is safe to run on the packet, a verifier of the host system performs access bounds (also referred to as "bounds" hereafter) checks on the filter. Before a value (e.g., register) can be used as a pointer, the supervisor or OS of the host system processes the value and validates that the register value has been bounds checked. For example, if a register value is tested at <4096, the verifier concludes that the register value can be safely used to access packet data if a 4 kilobyte (KB) packet buffer has been allocated. If the register value cannot be safely used to access packet data, then the verifier may reject the filter.

When a packet is received by a host system, the packet may be synchronized to a processing device of the host system to ensure the processing device does not access stale data in a processing device cache. In conventional systems, packet data in the memory is automatically synchronized from the data written by the device. However, in Advanced RISC Machines (ARM) systems, the system may implement non-coherent direct-memory access (DMA) devices. In such systems, each time a packet is received by the NIC it is first synchronized to the cache of the processing device before the packet may be accessed by the processing device.

Fully-synchronizing all the data for every packet to the cache of the processing device may result in unnecessary data being stored in the cache of the processing device. For example, if the processing device determines that a packet is going to be dropped or redirected to another device, all the data from the packet will be flushed/evicted from the cache. The time and processing overhead spent synchronizing and subsequently flushing the data from the cache may cause a decrease in the processing of received packets. The efficient processing and dropping of packets received by a host system is particularly important in the event of a distributed denial-of-service (DDoS) attack. Accordingly, being unable to efficiently process received network packets causes a decrease in the performance of the host system.

Aspects of the disclosure address the above-noted and other deficiencies by synchronizing a portion of a packet to the cache of the processing device, rather than synchronizing the entire packet. When the verifier performs a bounds check on a filter, the verifier may determine a set of access bounds based on the filter. During the bounds check, the verifier may determine safe bounds for each register value used to access (e.g., load or store) data from a packet. The verifier may determine a maximum access bound from the safe bounds for one or more of the register values. The verifier may provide the safe bounds and/or maximum access bound to a driver of the NIC of the system. Thus, the safe bounds and/or maximum access bound may be known by the NIC driver prior to receiving a packet (e.g., at setup time) when the filter is attached to the MC driver.

Upon receiving an incoming packet, the NIC driver may identify the maximum access bound for the packet. The NIC driver may then synchronize a portion of the packet to the cache of the processing device. In embodiments, the portion of the packet that is synchronized may correspond to the maximum access bound. The portion of the packet that is synchronized to the cache of the processing device may include a header that is used by the filter to determine how the packet is to be handled (e.g., dropped, passed, re-transmitted, redirected). The processing device may read the header from the cache and determine how the packet is to be handled.

If the packet is to be utilized by the processing device, then the remaining data of the packet is synchronized with the cache of the processing device. For example, if the packet is to be passed to an application executed by processing device, or re-transmitted by the NIC, then the remaining data of the packet is synchronized with the cache of the processing device.

If the packet is not to be utilized by the processing device, then the remaining data of the packet is not synchronized with the cache of the processing device. For example, if the packet is to be dropped or redirected to another device, then the remaining data of the packet is not synchronized with the cache of the processing device. The portion of the packet that was synchronized with the cache can be flushed from the cache of the processing device.

By having processing logic of a processing device synchronize a portion of a packet to a cache, the amount of data that is to be synchronized and subsequently flushed from the cache is reduced. By preventing all the data of packets that are not to be utilized by the processing device from being synchronized to the cache of the processing device, less time is spent synchronizing and flushing data associated with these packets from the cache, improving the speed at which packets may be processed. This improves the performance of the host system and may make the host system more resilient against DDoS attacks.

FIG. 1 is a block diagram that illustrates an example computer architecture 100, in accordance with some embodiments of the present disclosure. The computer architecture 100 may include host systems 110a, b.

As illustrated in FIG. 1, computer architecture 100 includes host systems 110a, b that include one or more computing processing devices 120a, data store 130, and network interface controller (NIC) 140. For clarity, a processing device and data store for host system 110b are not shown. The host systems 110a, b are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g. cell towers), etc. The network 105 may carry communications (e.g., data, message, packets, frames, etc.) between the various components of host systems 110a, b.

The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. In embodiments, data store 130 may include one or more direct-memory access (DMA) devices.

The NIC 140 may connect host system 110a to network 105 and send/receive communications for the host system 110a via the network 105. The NIC 140 includes one or more computing processing devices 120b that execute a driver 142. The driver 142 may control operations performed by NIC 140 and enable communication between the NIC 140 and the OS of host system 110a. The NIC 140 may send and receive packets 144 to and from host system 110a via the network 105.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The host systems 110a, b may include any suitable type of computing device or machine that has a programmable processor including, for example, server computers, desktop computers, laptop computers, tablet computers, smartphones, set-top boxes, etc. In some examples, host systems 110a, b may comprise a single machine or may include multiple interconnected machines (e.g., multiple servers configured in a cluster). Host systems 110a, b may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

Processing device 120a of host system 110a may include a cache 125 to store data that is to be accessed by processing device 120a. In embodiments, the cache 125 may be a random-access memory, such as dynamic random-access memory (DRAM). In embodiments, processing device 120a may implement an Advanced RISC Machines (ARM) architecture.

In embodiments, processing device 120a may execute a bound determining component 127. In embodiments, the bound determining component 127 may include a verifier that performs a bounds check on a filter to be used for XDP. The bound determining component 127 may determine a set of access bounds for the filter that specifies how received network packets are to be handled. The bound determining component 127 may further determine a maximum access bound for one or more register values of the filter. The bound determining component 127 may also provide the set of access bounds and/or a maximum access bound to driver 142 of NIC 140.

In embodiments, processing device 120a may execute a partial synchronization component 129. The partial synchronization component 129 may synchronize a portion of a network packet from the NIC 140 to the cache 125 of the processing device 120a. The partial synchronization component 129 may determine whether the packet is to be utilized by the processing device 120a. Further details regarding bound determining component 127 and partial synchronization component 129 will be discussed at FIGS. 2-11 below.

Figure 2:
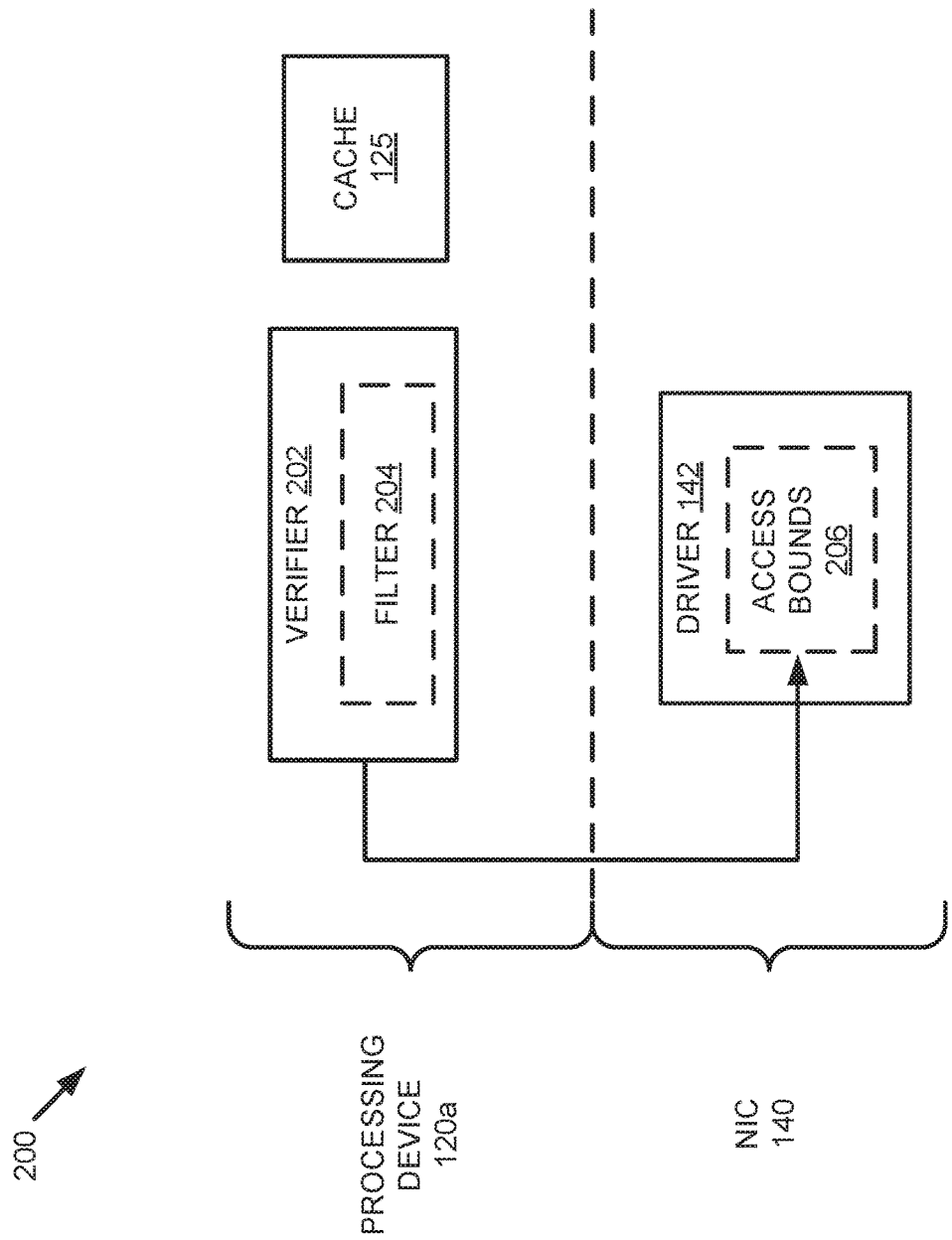
FIG. 2 is an illustration of an example of a verifier providing a set of access bounds to a NIC in accordance with embodiments of the disclosure.

FIG. 2 is an illustration 200 of an example of a verifier providing a set of access bounds to a NIC in accordance with embodiments of the disclosure. The top portion of illustration 200 may include software and/or hardware components of processing device 120a, while the bottom portion of illustration 200 may include software and/or hardware components of NIC 140.

Processing device 120a may include a verifier 202, a filter 204 and a cache 125. As previously described, the filter 204 may be executed by processing device 120a to determine how the packet is to be utilized/handled, make any necessary modifications to the packet, and transmit a command to NIC 140 based on how the packet is determined to be handled. For example, the filter 204 may transmit a command to NIC 140 to cause the NIC 140 to drop a packet, pass the packet to an application executed by processing device 120a, re-transmit the packet out of NIC 140, or transmit the packet to another device.

Verifier 202 may perform an access bounds check on filter 204 to determine whether filter 204 is safe to run on a packet received by NIC 140, as previously described. When the verifier 202 performs the bounds check on filter 204, the verifier 202 may also determine access bounds 206 for the filter 204. In an embodiment, the access bounds 206 may correspond to safe bounds for each register value used to access data from a packet received by NIC 140. In embodiments, the access bounds 206 correspond to a maximum bound from the safe bounds for one or more of the register values.

Upon determining the access bounds 206, the verifier 202 may provide the access bounds 206 to a driver 142 of the NIC 140. In embodiments, the access bounds 206 may be transmitted to the driver 142 before packets are received by MC 140. For example, the access bounds 206 may be transmitted to the driver 142 of NIC 140 during a system setup.

Figure 3:
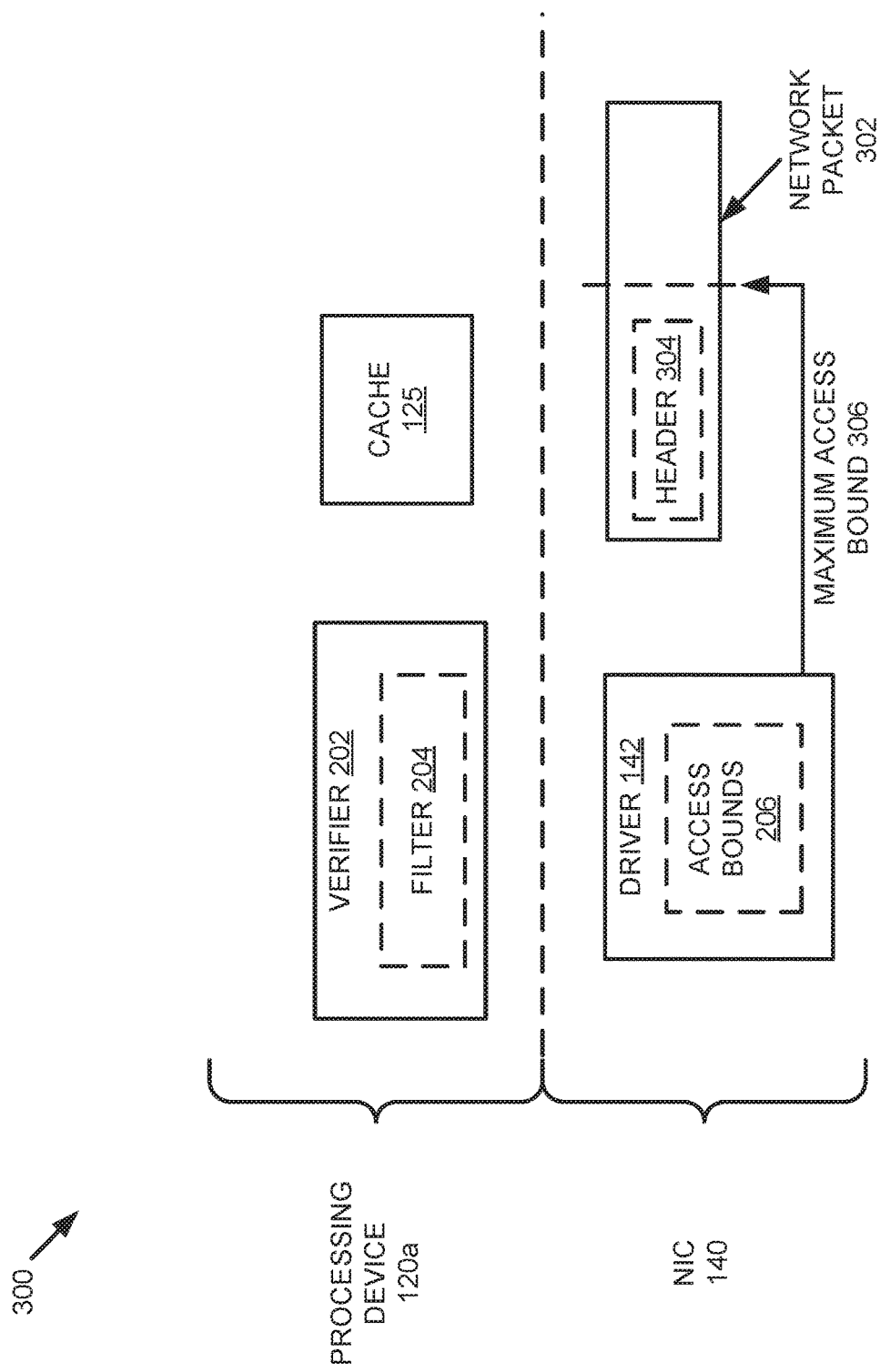
FIG. 3 is an illustration of an example of a driver of a NIC identifying a maximum access bound in accordance with embodiments of the disclosure.

FIG. 3 is an illustration 300 of an example of a driver of a NIC identifying a maximum access bound in accordance with embodiments of the disclosure. In illustration 300, a network packet 302 has been received by NIC 140 via a network (e.g., network 105 of FIG. 1). The network packet 302 may include a header 304 that includes information (e.g., IP addresses, protocols, etc.) used by filter 204 to determine how network packet 302 is to be handled, as will be described in further detail below. Upon receiving the network packet 302, the driver 142 of NIC 140 may identify a maximum access bound 306 from the access bounds 206 previously received from verifier 202. For example, the maximum access bound 306 may be a value of 4 KB.

Figure 4:
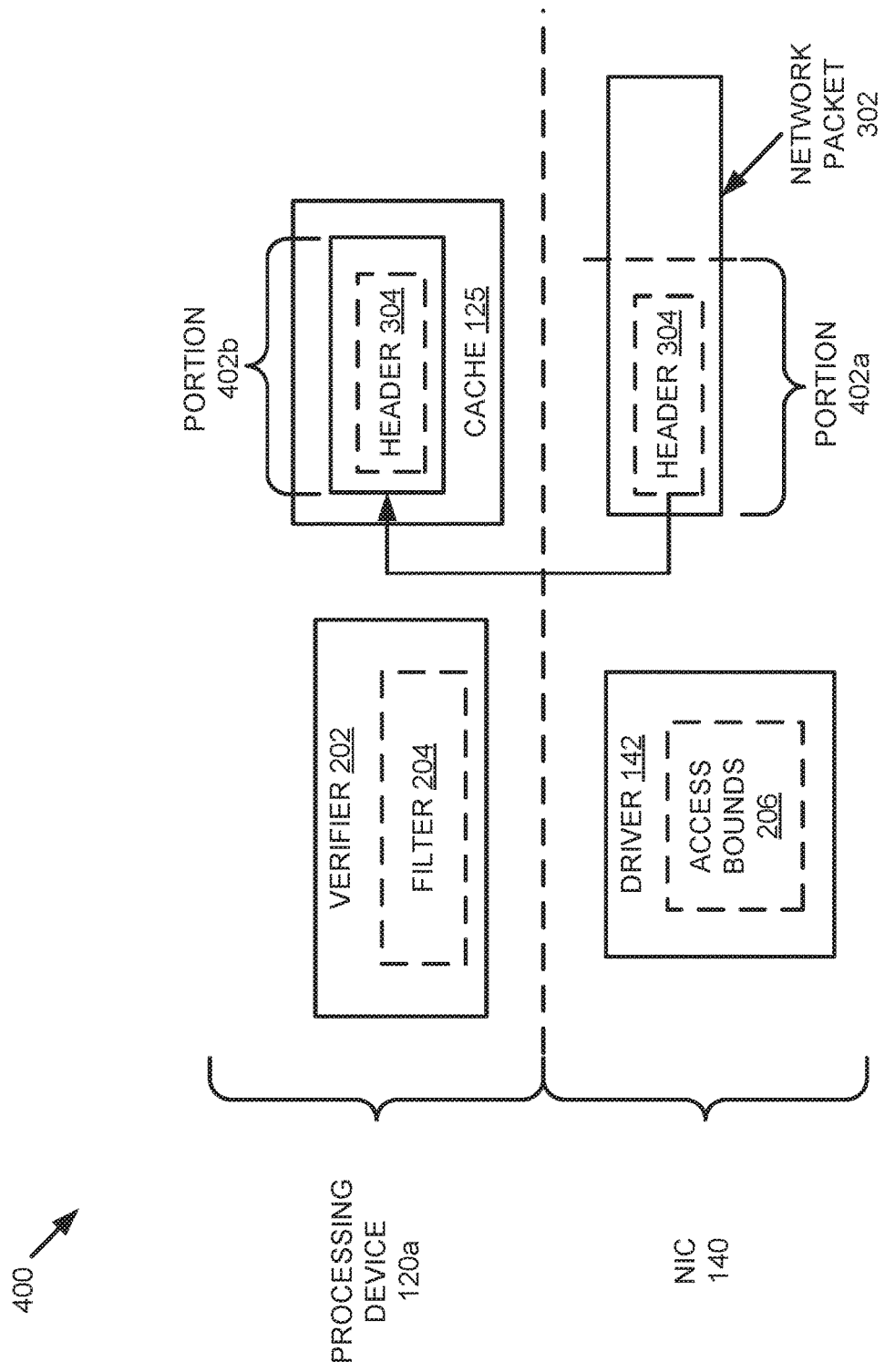
FIG. 4 is an illustration of an example of a portion of a network packet being synchronized to a cache of a processing device in accordance with embodiments of the disclosure.

FIG. 4 is an illustration 400 of an example of a portion of a network packet being synchronized to a cache of a processing device in accordance with embodiments of the disclosure. Upon identifying the maximum access bound (e.g., maximum access bound 306 of FIG. 3), the driver 142 may determine a portion 402a of the network packet 302 to be synchronized to cache 125 that corresponds to the maximum access bound. For example, if the maximum access bound is a value of 4 KB, then the driver 142 may determine a 4 KB portion 402a is to be synchronized to cache 125. The portion 402a of the network packet 302 to be synchronized to the cache 125 may include the header 304 of network packet 302 to enable filter 204 to read the information from the header 304 to determine how network packet 302 is to be handled.

Upon the determination, the portion 402b may be synchronized to the cache 125 of the processing device 120a. Once the portion 402b has been synchronized, the filter 204 may read the information from the header 304 stored in the cache 125 to determine how the network packet 302 is to be handled. For example, the filter 204 may read the information from the header 304 to determine whether the NIC 140 is to drop the network packet 302, pass the network packet 302 to an application executed by processing device 120a, re-transmit the network packet 302 out of NIC 140, or transmit the network packet 302 to another device.

Figure 5:
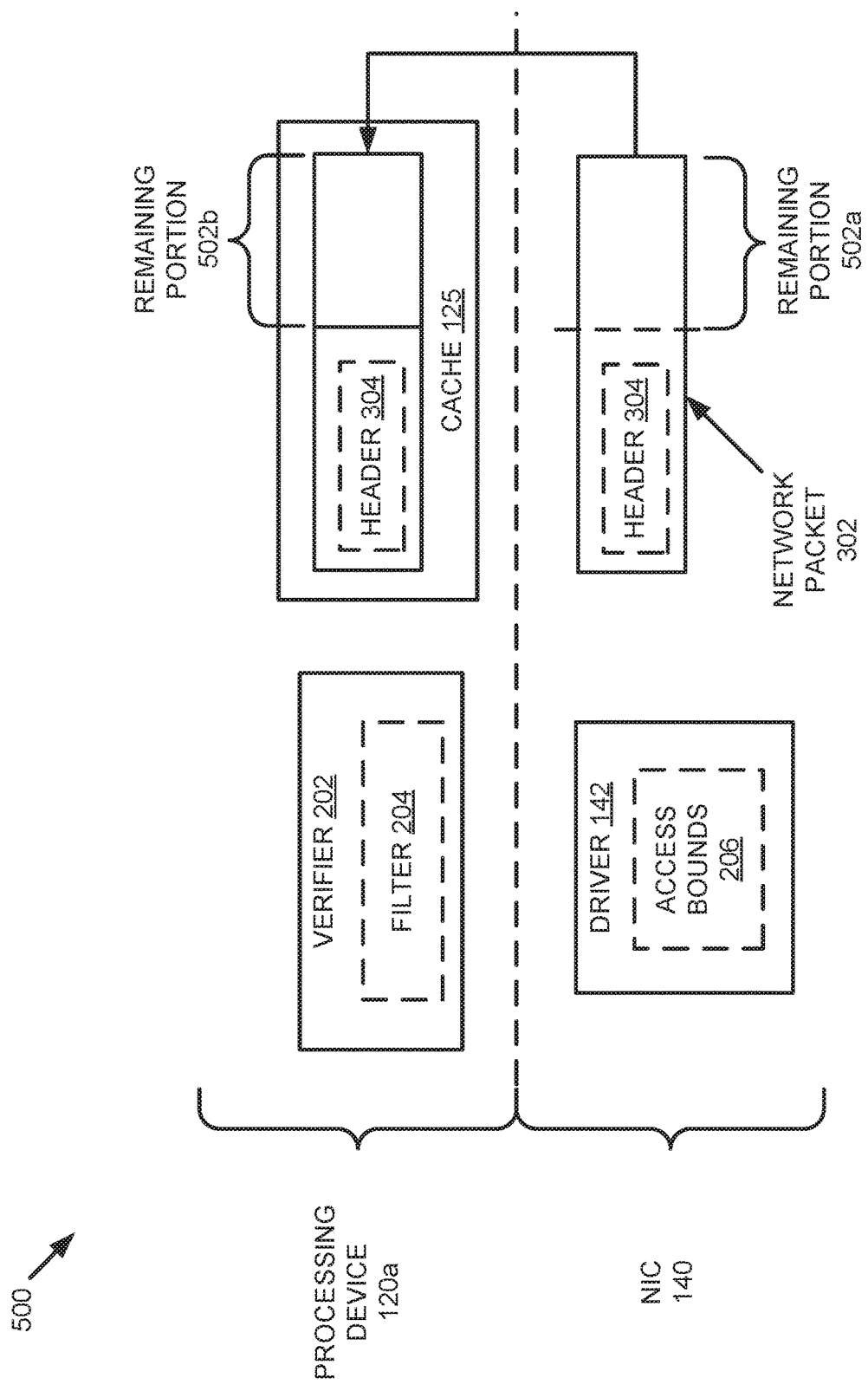
FIG. 5 is an illustration of an example of a remaining portion of a network packet being synchronized to a cache of a processing device in accordance with embodiments of the disclosure.

FIG. 5 is an illustration 500 of an example of a remaining portion of a network packet being synchronized to a cache of a processing device in accordance with embodiments of the disclosure. Upon determining how the network packet 302 is to be handled, the filter 204 may transmit a command to the driver 142 of the NIC. If the filter 204 determines that the network packet 302 is to be utilized by the processing device 120a, the command may cause the driver 142 to synchronize the remaining portion 502a of network packet 302 to the cache 125 (e.g., remaining portion 502b) of the processing device 120a. The remaining portion 502a of the network packet 302 may correspond to the remaining data of network packet 302 that was not previously synchronized to the cache at FIG. 4. Upon synchronizing the remaining portion 502b to the cache 125, the network packet 302 may be utilized by the processing device 120a.

In embodiments, the network packet 302 may be utilized by the processing device 120a if the network packet is to be passed to an application executed by processing device 120a. In an embodiment, the network packet 302 may be utilized by the processing device 120a if the network packet is to be re-transmitted out of the NIC 140.

If the filter 204 determines that the network packet 302 is not going to be utilized by the processing device 120a, the command may not cause the driver 142 to synchronize the remaining portion 502a of the network packet 302 to the cache 125, preventing the remaining portion 502a from being unnecessarily synchronized to the cache 125. In embodiments, the network packet 302 may not be utilized by the processing device 120a if the network packet 132 is to be dropped by the NIC 140. In an embodiment, the network packet 302 may not be utilized by the processing device 120a if the network packet is to be transmitted/redirected to another device, such as a device of host system 110b of FIG. 1.

Figure 6:
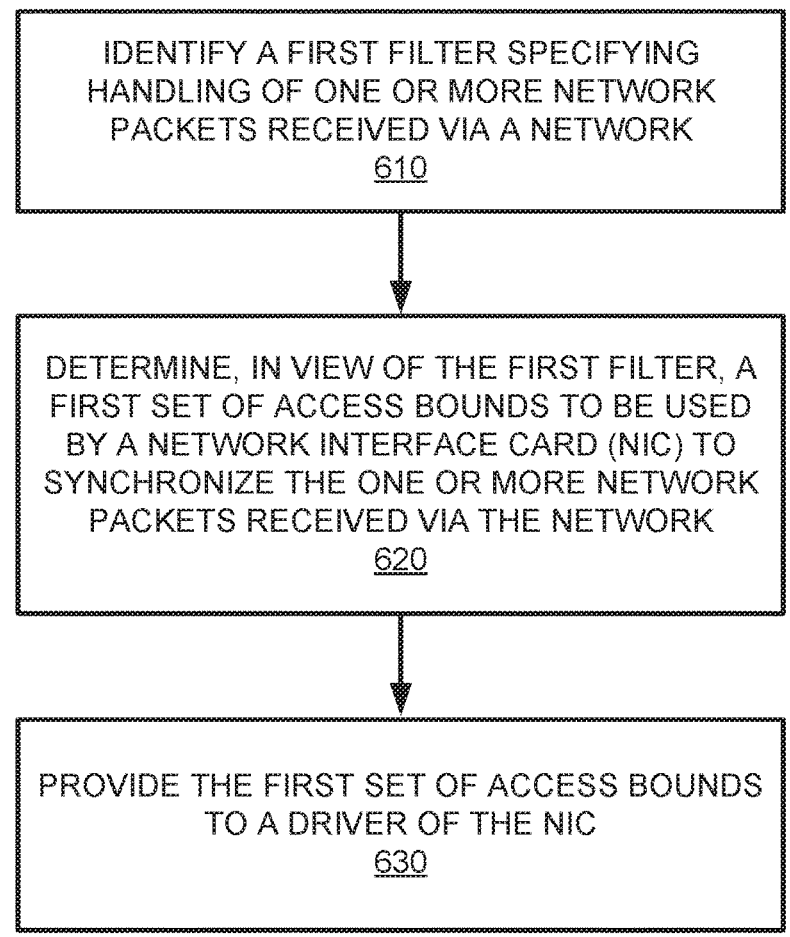
FIG. 6 is a flow diagram of a method of providing a set of access bounds to a driver of a NIC, in accordance with some embodiments.

FIG. 6 is a flow diagram of a method 600 of providing a set of access bounds to a driver of a NIC, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by bound determining component 127 of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where the processing logic identifies a first filter specifying handling of one or more network packets received via a network. As previously described, the first filter may determine whether network packets received via a network are to be utilized.

At block 620, the processing logic determines, in view of the first filter, a first set of access bounds to be used by a network interface card (NIC) to synchronize the one or more network packets received via the network. In embodiments, the first set of access bounds may correspond to safe access bounds and/or a maximum access bound to be used by the NIC to synchronize the network packets to a cache that is accessible by the processing logic.

At block 630, the processing logic provides the first set of access bounds to a driver of the NIC. In embodiments, the processing logic may provide the access bounds to a driver of the NIC before the NIC has received a network packet while using the first filter. For example, the processing logic may provide the set of access bounds to the driver on the NIC during system setup, upon receipt of a new filter, or upon switching to a different filter.

Figure 7:
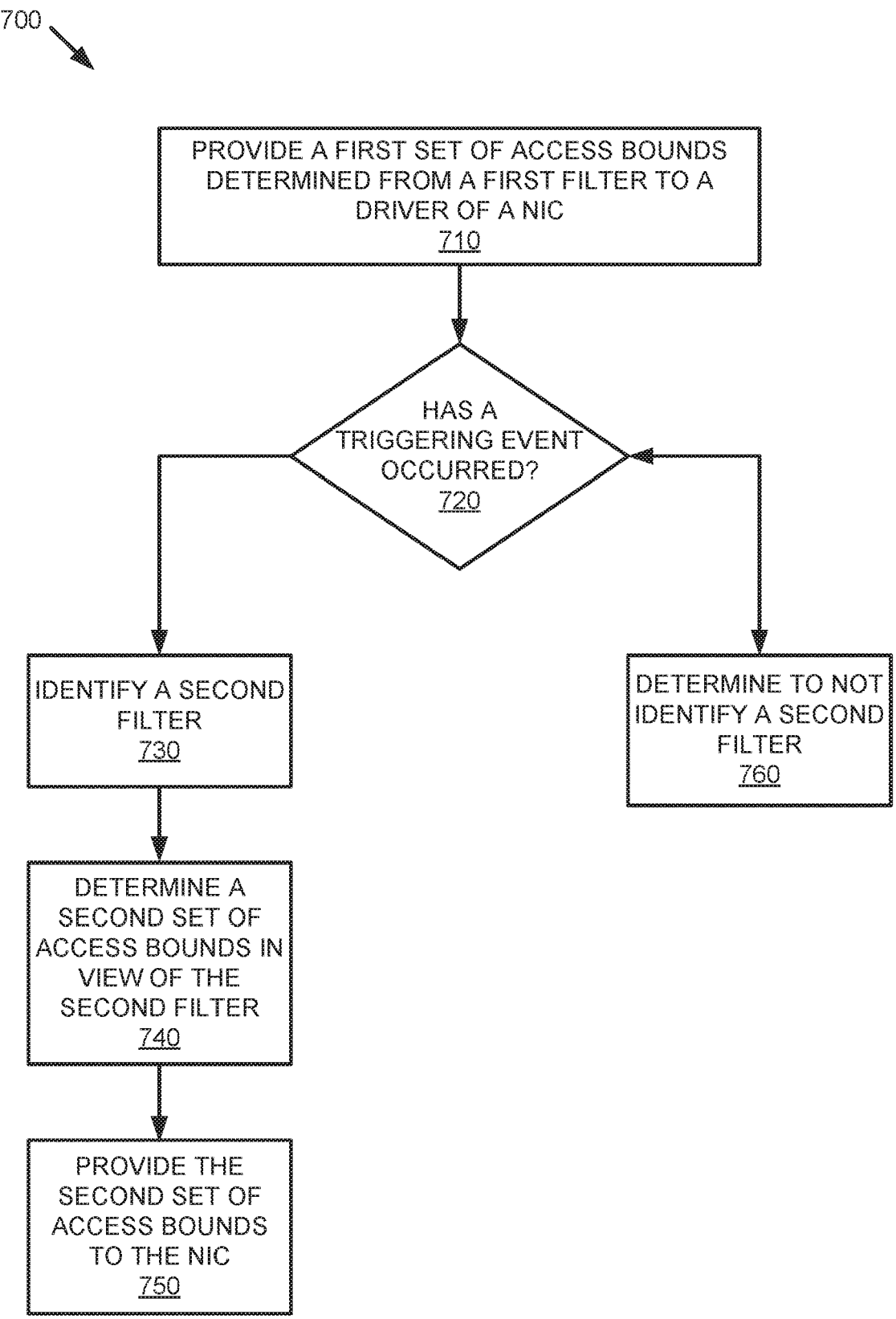
FIG. 7 is a flow diagram of a method of switching a filter in response to an occurrence of a triggering event, in accordance with some embodiments.

FIG. 7 is a flow diagram of a method 700 of switching a filter in response to an occurrence of a triggering event, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by bound determining component 127 of FIG. 1.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic provides a first set of access bounds determined for a first filter to a driver of a NIC.

At block 720, the processing logic determines if a triggering event has occurred. A triggering event may be an event that causes the processing logic to select a different filter to be used for determining how packets are handled. In embodiments, a triggering event may be a distributed denial-of-service (DDoS) attack where a large number of network packets are sent to overwhelm the NIC. In embodiments, the processing logic may determine that a DDoS attack is occurring if the number of received packets per unit of time exceeds a threshold. For example, if the number of received packets per second exceeds a threshold of 100 packets per second, then the processing logic may determine that a DDoS attack may be occurring. In an embodiment, a triggering event may be another type of network event that causes the processing logic to select a different filter.

If the processing logic determines that a triggering event has occurred, at block 730 the processing logic identifies a second filter. The second filter may specify how packets received by the NIC are handled. In embodiments, the second filter may have different access bounds than the first filter.

At block 740, the processing logic determines a second set of access bounds in view of the second filter. As discussed above, the second filter may have different access bounds than the first filter. In an embodiment, the second filter may have a smaller maximum access bound than the first filter.

As discussed above, the amount of data synchronized to the cache of a processing device may correspond to the maximum access bound of the filter. Accordingly, if the second filter has a smaller maximum access bound, the second filter may be able to process received network packets more quickly as the amount of data being synchronized per network packet is reduced. In the event of a DDoS attack, this may enable the processing logic to more quickly process the large number of packets being sent to the NIC and minimize the effects of the DDoS attack. For example, the processing logic may be able to quickly identify packets of a DDoS attack and command the NIC to drop these packets.

At block 750, the processing logic may provide the second set of access bounds to the NIC. The NIC may then begin synchronizing a portion of received network packets that corresponds to the maximum access bound of the second set of access bounds.

If the processing logic determines that a triggering event has not occurred, at block 760 to processing logic determines to not identify a second filter.

Figure 8:
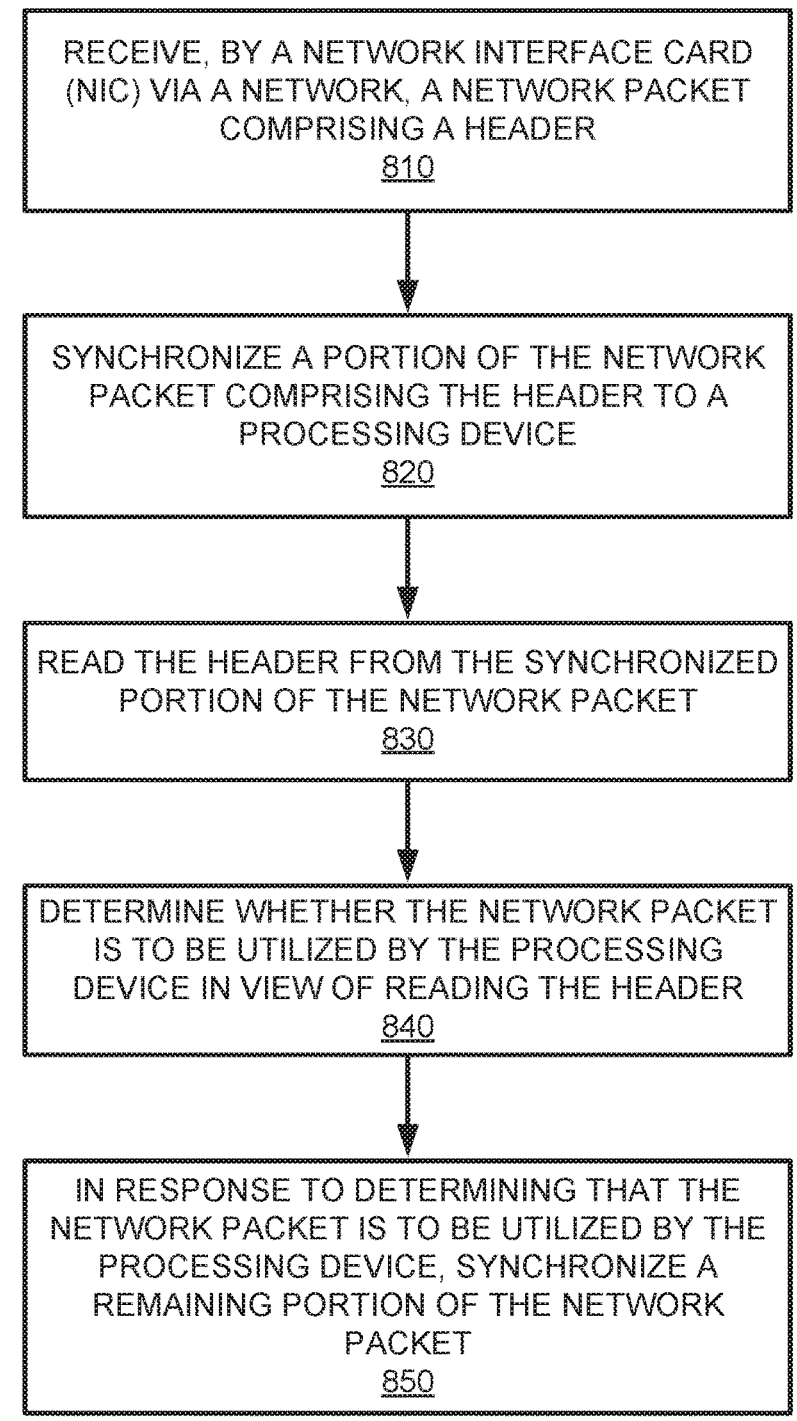
FIG. 8 is a flow diagram of a method of partial synchronization of a network packet, in accordance with some embodiments.

FIG. 8 is a flow diagram of a method 800 of partial synchronization of a network packet, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by processing device 120b, bound determining component 127 and/or partial synchronization component 129 of host system 110a of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic receives, by a network interface card (NIC) via a network, a network packet comprising a header.

At block 820, the processing logic synchronizes a portion of the network packet comprising the header to a processing device. In embodiments, the portion of the network packet may correspond to a maximum access bound of a filter executed by the processing device. In embodiments, the processing logic may synchronize the portion of the network packet to a cache (e.g., cache 125 of FIG. 1) of the processing device (e.g., processing device 120a of FIG. 1).

At block 830, the processing logic reads the header from the synchronized portion of the network packet. As previously described, upon synchronization of the portion of the packet to the cache of the processing device, the processing logic may read the information associated with the packet from the header to determine how the packet is to be handled.

At block 840, the processing logic determines whether the network packet is to be utilized by the processing device in view of reading the header.

At block 850, in response to determining that the network packet is to be utilized by the processing device, the processing logic synchronizes a remaining portion of the network packet.

Figure 9:
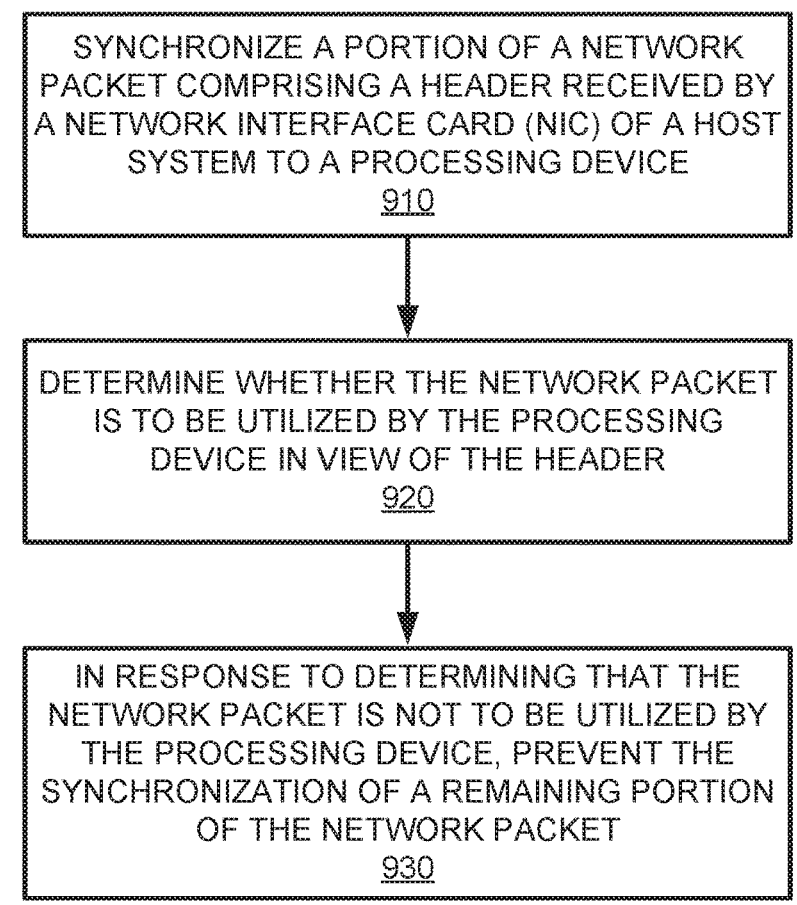
FIG. 9 is a flow diagram of a method of preventing synchronization of a remaining portion of a network packet, in accordance with some embodiments.

FIG. 9 is a flow diagram of a method 900 of preventing synchronization of a remaining portion of a network packet, in accordance with some embodiments. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 900 may be performed by partial synchronization component 129 of FIG. 1.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic synchronizes a portion of a network packet comprising a header received by a network interface card (NIC) of a host system to a processing device.

At block 920, the processing logic determines whether the network packet is to be utilized by the processing device in view of reading the header.

At block 930, in response to determining that the network packet is not to be utilized by the processing device, the processing logic prevents the synchronization of a remaining portion of the network packet, preventing the remaining portion from being unnecessarily synchronized to the processing device.

Figure 10:
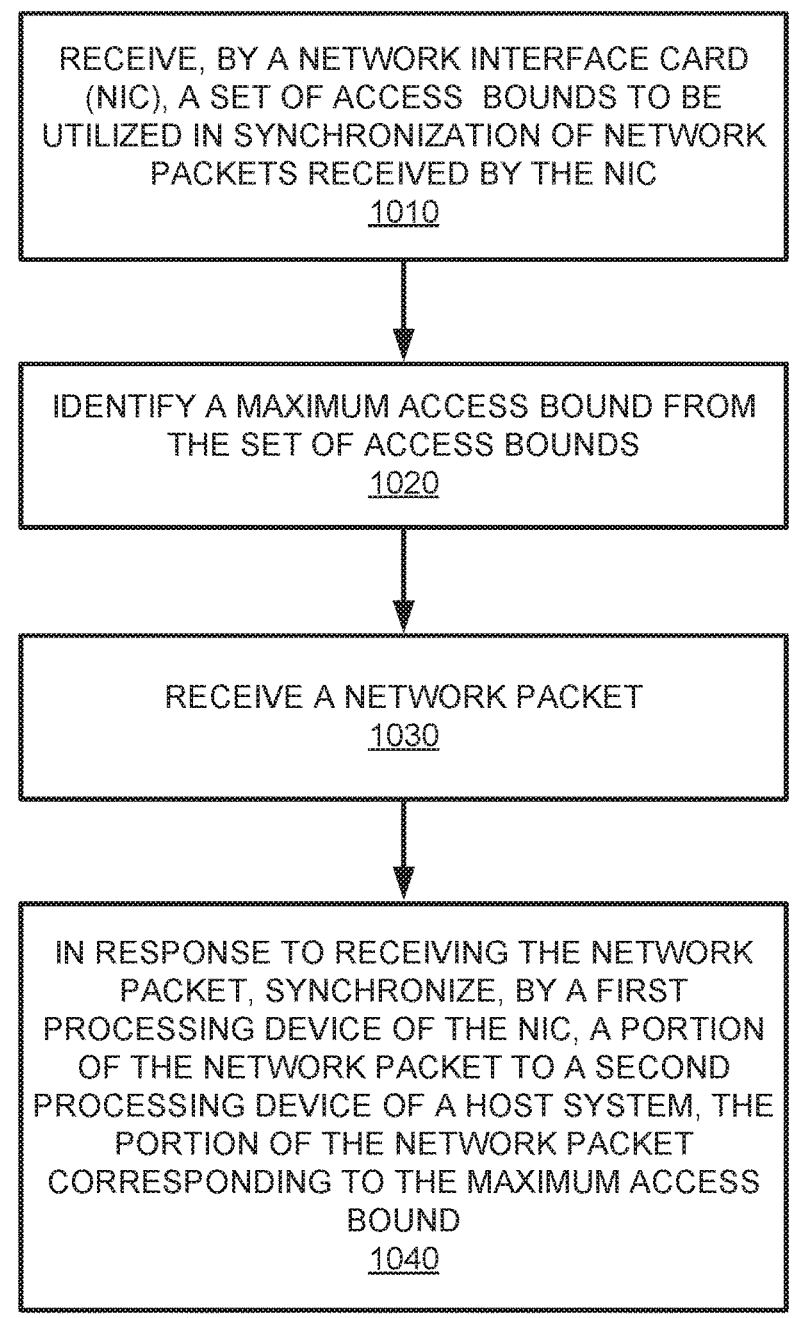
FIG. 10 is a flow diagram of a method of a network interface card synchronizing a portion of a network packet to a processing device, in accordance with some embodiments.

FIG. 10 is a flow diagram of a method 1000 of a network interface card synchronizing a portion of a network packet to a processing device, in accordance with some embodiments. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1000 may be performed by processing device 120b of NIC 140 of FIG. 1.

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

Method 1000 begins at block 1010, where the processing logic of the NIC receives a set of access bounds to be utilized in synchronization of network packets received by the NIC. In embodiments, the set of access bounds may be received from a second processing device (e.g., processing device 120a of FIG. 1) of a host system (e.g., host system 110a of FIG. 1) operatively coupled to the NIC.

At block 1020, the processing logic identifies a maximum access bound from the set of access bounds.

At block 1030, the processing logic receives a network packet. In embodiments, the network packet may be received via a network (e.g., network 105 of FIG. 1) of a computing architecture.

At block 1040, in response to receiving the network packet, the processing logic may synchronize a portion of the network packet to the second processing device (e.g., processing device 120a of FIG. 1) of the host system (e.g., host system 110a of FIG. 1). In embodiments, the portion of the network packet that is synchronized to the second processing device may correspond to the maximum access bound identified from the set of access bounds at block 1020.

In embodiments, the processing logic may receive a command from the second processing device that indicates how the packet is to be handled by the NIC, as previously described. For example, the processing logic may receive a command from the second processing device indicating that a remaining portion of the network packet is to be synchronized with the second processing device. In some embodiments, the processing logic may receive a second set of access bounds from the second processing device and may subsequently perform one or more of operations of method 1000. For example, the processing logic may receive a second set of access bounds upon the occurrence of a triggering event, such as a DDoS attack.

Figure 11:
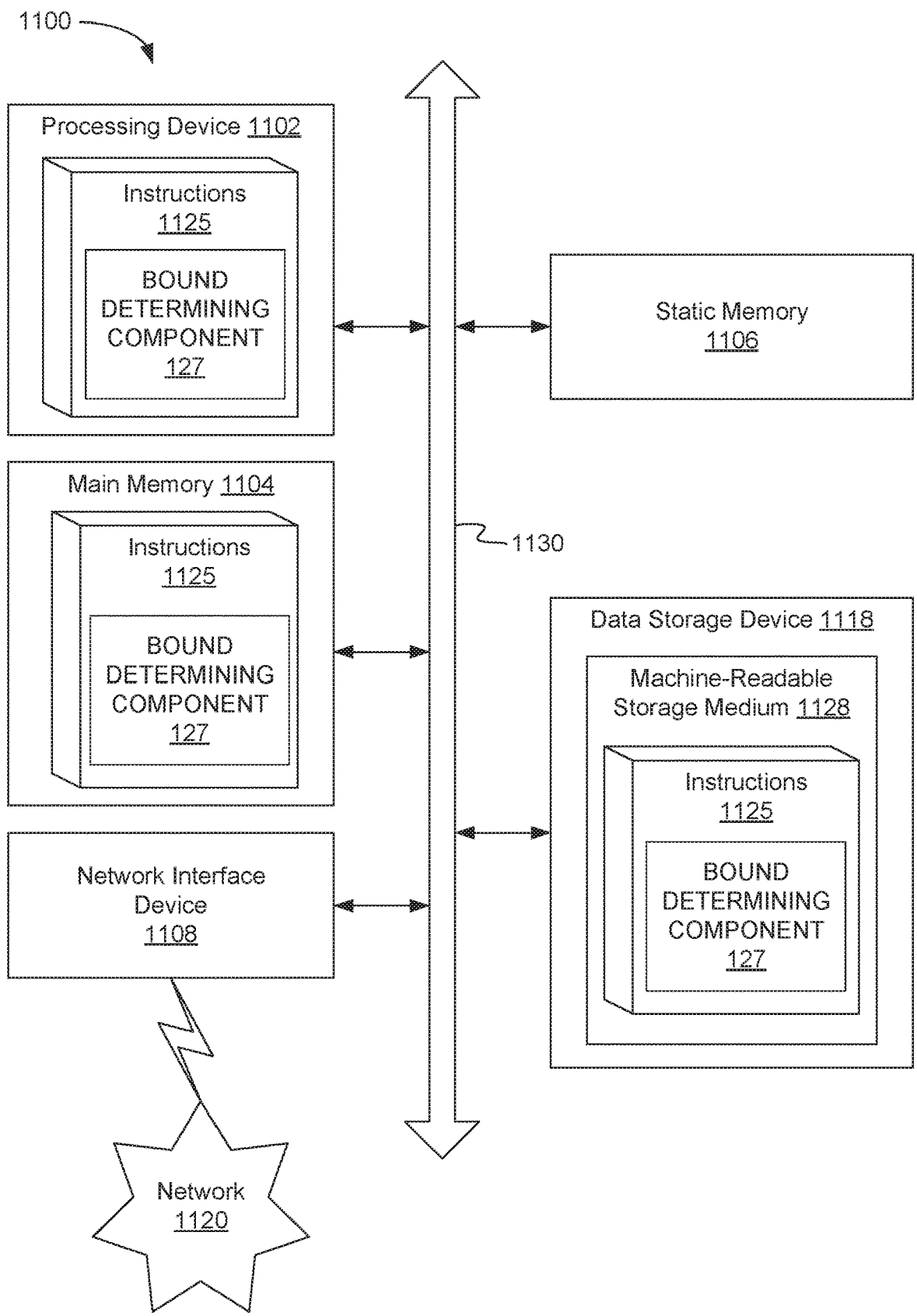
FIG. 11 is a block diagram of an example apparatus that may perform one or more of the operations described herein, in accordance with some embodiments of the present disclosure.

FIG. 11 is a block diagram of an example computing device 1100 that may perform one or more of the operations described herein, in accordance with some embodiments. Computing device 1100 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1100 may include a processing device (e.g., a general purpose processor, a PLD, etc.) 1102, a main memory 1104 (e.g., synchronous dynamic random access memory (DRAM), read-only memory (ROM)), a static memory 1106 (e.g., flash memory and a data storage device 1118), which may communicate with each other via a bus 1130.

Processing device 1102 may be provided by one or more general-purpose processing devices such as a microprocessor, central processing unit, or the like. In an illustrative example, processing device 1102 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1102 may also comprise one or more special-purpose processing devices such as an application specific integrated circuit (ASIC), a field programmable gate array (FPGA), a digital signal processor (DSP), network processor, or the like. The processing device 1102 may be configured to execute the operations described herein, in accordance with one or more aspects of the present disclosure, for performing the operations and steps discussed herein.

Computing device 1100 may further include a network interface device 1108 which may communicate with a network 1120. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse) and an acoustic signal generation device 1116 (e.g., a speaker). In one embodiment, video display unit 1110, alphanumeric input device 1112, and cursor control device 1114 may be combined into a single component or device (e.g., an LCD touch screen).

Data storage device 1118 may include a computer-readable storage medium 1128 on which may be stored one or more sets of instructions 1125 that may include instructions for a bound determining component and/or a partial synchronization component, e.g., bound determining component 127 and/or partial synchronization component 129 for carrying out the operations described herein, in accordance with one or more aspects of the present disclosure. Instructions 1125 may also reside, completely or at least partially, within main memory 1104 and/or within processing device 1102 during execution thereof by computing device 1100, main memory 1104 and processing device 1102 also constituting computer-readable media. The instructions 1125 may further be transmitted or received over a network 1120 via network interface device 1108.

While computer-readable storage medium 1128 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising identifying a first filter specifying handling of one or more network packets received via a network; determining, by a processing device in view of the first filter, a first set of access bounds to be used by a network interface card (NIC) to synchronize the one or more network packets received via the network; and providing the first set of access bounds to a driver of the NIC.

Example 2 is the method of Example 1, wherein the first set of access bounds comprises a first maximum access bound.

Example 3 is the method of Example 2, wherein providing the first set of access bounds to the driver of the NIC causes the NIC to synchronize a portion of the one or more network packets received via the network corresponding to the first maximum access bound.

Example 4 is the method of Example 1, further comprising: identifying a second filter specifying the handling of one or more network packets received via the network; determining, in view of the second filter, a second set of access bounds to be used by the NIC to synchronize the one or more network packets received via the network; and providing the second set of access bounds to the driver of the NIC.

Example 5 is the method of Example 4, wherein the first set of access bounds comprises a first maximum access bound and the second set of access bounds comprises a second maximum access bound and wherein the first maximum access bound is greater than the second maximum access bound.

Example 6 is the method of Example 4, wherein the second filter is identified in response to an occurrence of a triggering event.

Example 7 is the method of Example 6, wherein the triggering event comprises a distributed denial-of-service (DDoS) attack.

Example 8 is a system comprising a memory; and a processing device, operatively coupled to the memory, to receive, by a network interface card (NIC) via a network, a network packet comprising a header; synchronize a portion of the network packet comprising the header to the processing device; read the header from the synchronized portion of the network packet; determine whether the network packet is to be utilized by the processing device in view of reading the header; and in response to determining that the network packet is to be utilized by the processing device, synchronize a remaining portion of the network packet.

Example 9 is the system of Example 8, wherein to determine that the network packet is to be utilized by the processing device in view of reading the header, the processing device is further to determine that the network packet is to be passed to an application executed by the processing device.

Example 10 is the system of Example 8, wherein to determine that the network packet is to be utilized by the processing device in view of reading the header, the processing device is further to determine that the network packet is to be retransmitted to the NIC by the processing device.

Example 11 is the system of Example 8, wherein to determine whether the network packet is to be utilized by the processing device in view of reading the header, the processing device is further to identify a filter that specifies handling of network packets received by the NIC, wherein the filter indicates whether the network is to be utilized by the processing device in view of the header.

Example 12 is the system of Example 8, wherein the portion of the network packet that is synchronized corresponds to a maximum access bound that is determined in view of a filter that specifies handling of network packets received by the NIC.

Example 13 is the system of Example 12, wherein the processing device is further to identify a second filter that specifies the handling of network packets received by the NIC; determine a second maximum access bound in view of the second filter; receive, by the NIC, a second network packet; and synchronize a second portion of the second network packet comprising to the processing device, wherein the second portion corresponds to the second maximum access bound.

Example 14 is the system of Example 8, wherein the processing device is further to store the header in a cache operatively coupled to the processing device.

Example 15 is a non-transitory computer-readable storage medium including instructions that, when executed by a processing device, cause the processing device to synchronize a portion of a network packet comprising a header received by a network interface card (NIC) of a host system to the processing device; determine whether the network packet is to be utilized by the processing device in view of the header; and in response to determining that the network packet is not to be utilized by the processing device, preventing the synchronization of a remaining portion of the network packet.

Example 16 is the non-transitory computer-readable storage medium of Example 15, wherein to determine that the network packet is not to be utilized by the processing device in view of reading the header, the processing device is further to determine that the network packet is to be dropped by the NIC.

Example 17 is the non-transitory computer-readable storage medium of Example 15, wherein to determine that the network packet is not to be utilized by the processing device in view of reading the header, the processing device is further to determine that the network packet is to be transferred to a second NIC of a second host system.

Example 18 is the non-transitory computer-readable storage medium of Example 15, wherein to determine whether the network packet is to be utilized by the processing device in view of reading the header, the processing device is further to identify a filter that specifies handling of network packets received by the NIC, wherein the filter indicates whether the network is to be utilized by the processing device in view of the header.

Example 19 is the non-transitory computer-readable storage medium of Example 15, wherein the portion of the network packet that is synchronized corresponds to a maximum access bound that is determined in view of a filter that specifies handling of network packets received by the NIC.

Example 20 is the non-transitory computer-readable storage medium of Example 19, wherein the processing device is further to identify a second filter that specifies the handling of network packets received by the NIC; determine a second maximum access bound in view of the second filter; receive, by the NIC, a second network packet; and synchronize a second portion of the second network packet comprising to the processing device, wherein the second portion corresponds to the second maximum access bound.

Example 21 is the non-transitory computer-readable storage medium of Example 15, wherein the processing device is further to store the header in a cache operatively coupled to the processing device.

Example 22 is a method comprising receiving, by a network interface card (NIC), a set of access bounds to be utilized in synchronization of network packets received by the NIC; identifying a maximum access bound from the set of access bounds; receiving a network packet; and in response to receiving the network packet, synchronizing, by a first processing device of the NIC, a portion of the network packet to a second processing device of a host system, the portion of the network packet corresponding to the maximum access bound.

Example 23 is the method of Example 22, further comprising receiving, from the second processing device of the host system, a command to synchronize a remaining portion of the network packet to the second processing device; and in response to receiving the command, synchronizing the remaining portion of the network packet to the second processing device.

Example 24 is the method of Example 22, further comprising receiving, from the second processing device of the host system, a command to drop the network packet; and in response to receiving the command, dropping the network packet without synchronizing a remaining portion of the network packet to the second processing device.

Example 25 is the method of claim 22, further comprising receiving, from the second processing device of the host system, a command to transfer the network packet to a second NIC; and in response to receiving the command, transfer the network packet to the second NIC without synchronizing a remaining portion of the network packet to the second processing device.

Example 26 is the method of Example 22, further comprising receiving, by the NIC, a second set of access bounds to be utilized in the synchronization of network packets received by the NIC; identifying a second maximum access bound from the set of access bounds; receiving a second network packet; and in response to receiving the second network packet, synchronizing, by the first processing device of the NIC, a second portion of the second network packet to the second processing device of the host system, the second portion of the second network packet corresponding to the second maximum access bound.

Example 27 is the method of Example 26, wherein the second set of access bounds is received in response to an occurrence of a triggering event.

Example 28 is the method of Example 27, wherein the triggering event comprises a distributed denial-of-service (DDoS) attack.

Example 29 is the method of Example 22, wherein the set of access bounds are determined in view of a filter that specifies handling of the network packets received by the NIC.

Example 30 is an apparatus comprising means for identifying a first filter specifying handling of one or more network packets received via a network; means for determining, in view of the filter, a first set of access bounds to be used by a network interface card (NIC) to synchronize the one or more network packets received via the network; and means for providing the first set of access bounds to a driver of the NIC.

Example 31 is the apparatus of Example 30, wherein the first set of access bounds comprises a first maximum access bound.

Example 32 is the apparatus of Example 31, wherein providing the first set of access bounds to the driver of the NIC causes the NIC to synchronize a portion of the one or more network packets received via the network corresponding to the first maximum access bound.

Example 33 is the apparatus of Example 30, further comprising means for identifying a second filter specifying the handling of one or more network packets received via the network; means for determining, in view of the second filter, a second set of access bounds to be used by the NIC to synchronize the one or more network packets received via the network; and means for providing the second set of access bounds to the driver of the NIC.

Example 34 is the apparatus of Example 33, wherein the first set of access bounds comprises a first maximum access bound and the second set of access bounds comprises a second maximum access bound and wherein the first maximum access bound is greater than the second maximum access bound.

Example 35 is the apparatus of Example 33, wherein the second filter is identified in response to an occurrence of a triggering event.

Example 36 is the apparatus of Example 35, wherein the triggering event comprises a distributed denial-of-service (DDoS) attack.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A system comprising:
a memory; and
a processing device, operatively coupled to the memory, to:
receive, by a network interface card (NIC) via a network, a network packet comprising a header;
synchronize a portion of the network packet comprising the header to the memory, wherein the portion is less than an entirety of the network packet;
read the header from the synchronized portion of the network packet;
determine whether the network packet is to be utilized by the processing device in view of reading the header; and
in response to determining that the network packet is to be utilized by the processing device, synchronize a remaining portion of the network packet.

2. The system of claim 1, wherein to determine that the network packet is to be utilized by the processing device in view of reading the header, the processing device is further to:
determine that the network packet is to be passed to an application executed by the processing device.

3. The system of claim 1, wherein to determine that the network packet is to be utilized by the processing device in view of reading the header, the processing device is further to:
determine that the network packet is to be retransmitted to the NIC by the processing device.

4. The system of claim 1, wherein to determine whether the network packet is to be utilized by the processing device in view of reading the header, the processing device is further to:

identify a filter that specifies handling of network packets received by the NIC, wherein the filter indicates whether the network is to be utilized by the processing device in view of the header.

5. The system of claim 1, wherein the portion of the network packet that is synchronized corresponds to a maximum access bound that is determined in view of a filter that specifies handling of network packets received by the NIC.

6. The system of claim 5, wherein the processing device is further to:
identify a second filter that specifies the handling of network packets received by the NIC;
determine a second maximum access bound in view of the second filter;
receive, by the NIC, a second network packet; and
synchronize a second portion of the second network packet comprising to the processing device, wherein the second portion corresponds to the second maximum access bound.

7. The system of claim 6, wherein the second filter is identified in response to detecting a distributed denial-of-service (DDoS) attack.

8. A method comprising:
receiving, by a network interface card (NIC) via a network, a network packet comprising a header;
synchronizing, by a processing device, a portion of the network packet comprising the header to a memory operatively coupled to the processing device, wherein the portion is less than an entirety of the network packet;
reading the header from the synchronized portion of the network packet;
determining whether the network packet is to be utilized by the processing device in view of reading the header; and
in response to determining that the network packet is to be utilized by the processing device, synchronizing a remaining portion of the network packet.

9. The method of claim 8, wherein determining that the network packet is to be utilized by the processing device in view of reading the header further comprises:
determining that the network packet is to be passed to an application executed by the processing device.

10. The method of claim 8, wherein determining that the network packet is to be utilized by the processing device in view of reading the header further comprises:
determine that the network packet is to be retransmitted to the NIC by the processing device.

11. The method of claim 8, wherein determining whether the network packet is to be utilized by the processing device in view of reading the header further comprises:
identifying a filter that specifies handling of network packets received by the NIC, wherein the filter indicates whether the network is to be utilized by the processing device in view of the header.

12. The method of claim 8, wherein the portion of the network packet that is synchronized corresponds to a maximum access bound that is determined in view of a filter that specifies handling of network packets received by the NIC.

13. The method of claim 12, further comprising:
identifying a second filter that specifies the handling of network packets received by the NIC;
determining a second maximum access bound in view of the second filter;
receiving, by the NIC, a second network packet; and
synchronizing a second portion of the second network packet comprising to the processing device, wherein the second portion corresponds to the second maximum access bound.

14. The method of claim 13, wherein the second filter is identified in response to detecting a distributed denial-of-service (DDoS) attack.

15. A non-transitory computer-readable storage medium including instructions that, when executed by a processing device, cause the processing device to:
receive, by a network interface card (NIC) via a network, a network packet comprising a header;
synchronize, by the processing device, a portion of the network packet comprising the header to a memory operatively coupled to the processing device, wherein the portion is less than an entirety of the network packet;
read the header from the synchronized portion of the network packet;
determine whether the network packet is to be utilized by the processing device in view of reading the header; and
in response to determining that the network packet is to be utilized by the processing device, synchronize a remaining portion of the network packet.

16. The non-transitory computer-readable storage medium of claim 15, wherein to determine that the network packet is to be utilized by the processing device in view of reading the header, the processing device is further to:
determine that the network packet is to be passed to an application executed by the processing device.

17. The non-transitory computer-readable storage medium of claim 15, wherein to determine that the network packet is to be utilized by the processing device in view of reading the header, the processing device is further to:
determine that the network packet is to be retransmitted to the NIC by the processing device.

18. The non-transitory computer-readable storage medium of claim 15, wherein to determine whether the network packet is to be utilized by the processing device in view of reading the header, the processing device is further to:
identify a filter that specifies handling of network packets received by the NIC, wherein the filter indicates whether the network is to be utilized by the processing device in view of the header.

19. The non-transitory computer-readable storage medium of claim 15, wherein the portion of the network packet that is synchronized corresponds to a maximum access bound that is determined in view of a filter that specifies handling of network packets received by the NIC.

20. The non-transitory computer-readable storage medium of claim 19, wherein the processing device is further to:
identify a second filter that specifies the handling of network packets received by the NIC;
determine a second maximum access bound in view of the second filter;
receive, by the NIC, a second network packet; and
synchronize a second portion of the second network packet comprising to the processing device, wherein the second portion corresponds to the second maximum access bound.

* * * * *